United States Patent [19]

Kawahara et al.

[11] Patent Number: 5,340,287
[45] Date of Patent: Aug. 23, 1994

[54] SCROLL-TYPE COMPRESSOR HAVING A PLATE PREVENTING EXCESS LIFT OF THE CRANKSHAFT

[75] Inventors: Sadao Kawahara, Otsu; Yoshinori Kojima; Osamu Aiba, both of Kusatsu, all of Japan

[73] Assignee: Matsushita Electric Industrial Co., Ltd., Osaka, Japan

[21] Appl. No.: 688,557

[22] PCT Filed: Jun. 26, 1990

[86] PCT No.: PCT/JP91/01417
§ 371 Date: Sep. 3, 1991
§ 102(e) Date: Sep. 3, 1991

[87] PCT Pub. No.: WO91/06769
PCT Pub. Date: May 16, 1991

[30] Foreign Application Priority Data

Nov. 2, 1989 [JP] Japan .................. 1-287015

[51] Int. Cl.⁵ ............... F04B 35/04; F04C 18/04; H02K 1/06; F16C 19/52
[52] U.S. Cl. ............... 417/410 D; 418/55.1; 418/55.5; 418/57; 310/190; 310/209; 384/517
[58] Field of Search .............. 417/410 D; 418/55.1, 418/55.5, 57; 310/190, 191, 209; 384/517, 518, 563

[56] References Cited

U.S. PATENT DOCUMENTS 3,386,385 6/1968 Bartheld et al. ............ 384/517
4,624,630 11/1986 Hirahara et al. ............ 310/191

FOREIGN PATENT DOCUMENTS 827276 1/1952 Fed. Rep. of Germany ...... 384/517
58-172485 10/1983 Japan .
60-49290 4/1985 Japan .
62-253982 11/1987 Japan .
1170779 7/1989 Japan .
1177482 7/1989 Japan .

Primary Examiner—John J. Vrablik
Attorney, Agent, or Firm—Stevens, Davis, Miller & Mosher

[57] ABSTRACT

A scroll-type compressor has a crankshaft connected to the rotor of an electric motor for causing an orbiting motion of an orbiting scroll member and having a main shaft formed at one end thereof and supported by a main bearing, an orbiting drive shaft formed on the side of an orbiting end plate opposite to an orbiting scroll wrap and received in an eccentric bearing disposed at an eccentricity in the main shaft, a rolling type upper bearing supporting the end of the crankshaft opposite to the main shaft, and a lift limiting plate fixed to the lower surface of the upper bearing to prevent excessive lift of the crankshaft. A step is formed on the crankshaft between a portion of a greater diameter at which the crankshaft is connected to the rotor, and a portion of a smaller diameter at which the crankshaft is received in the upper bearing. The compressor further has a support member resting on the inner race of the upper bearing and a fixing member by which the crankshaft is suspended and supported from the support member such that a small clearance is left between the surface of the step of the crankshaft and the lift limiting plate. This configuration suppresses the generation of noise in the upper bearing attributable to axial vibration and resonance of the shaft system.

7 Claims, 9 Drawing Sheets

SCROLL-TYPE COMPRESSOR HAVING A PLATE PREVENTING EXCESS LIFT OF THE CRANKSHAFT

TECHNICAL FIELD

The present invention relates to an electric-motor-driven scroll-type compressor suitable for use as a refrigerating or air-conditioning refrigerant compressor or an air compressor.

BACKGROUND ART

As shown in FIGS. 1 and 2, a conventional compressor of the type mentioned above has a hermetic container 101 in which is fixed a stator 104 of an electric motor 103 for driving a compression mechanism 102. A crankshaft 106 for driving the compression mechanism 102 is connected to a rotor 105 of the electric motor 103. The bottom of the hermetic container 101 forms a lubricant reservoir 107. The compression mechanism 102 includes: a stationary scroll member 110 having a stationary frame 108 and a stationary spiral wrap 109 formed integrally with the stationary frame 108; an orbiting scroll member 113 having an orbiting scroll wrap 111 which meshes with the stationary sprial wrap 109 to form a plurality of compression working chambers 114 therebetween, and an orbiting end plate 112 on which the orbiting scroll wrap 111 is formed; and a rotation prevention member 115 which prevents the orbiting scroll member 113 from rotating about its own axis so as to allow the orbiting scroll member 113 only to orbit. An orbiting drive shaft 116 which is disposed on the side of the orbiting end plate 112 opposite to the orbiting scroll wrap 111 is received in an eccentric bearing 118 provided inside of a main shaft 117 which is formed on one end of the crankshaft 106. The crankshaft 106 is supported by a main bearing assembly 120 having a main bearing 119 which supports the main shaft 117 and an upper bearing assembly 122 having a slide-type upper bearing 121 which supports the end of the crankshaft 106 opposite to the main shaft 117. A thrust bearing 123 fixed to the main bearing assembly 120 bears axial thrust on the orbiting end plate 112. In operation, a gaseous refrigerant sucked from a suction pipe 124 connected to the compressor is introduced into the compressor 102 through a suction port 125 of the compression mechanism 102 and is compressed in the compression working chamber 114. The compressed gaseous refrigerant is discharged through a discharge port 126 and is delivered to the exterior of the compressor through a discharge chamber 127 and a discharge pipe 128 (refer to Japanese Patent Laid-Open Publication No. 1-177482).

In this known compressor, the crankshaft 106 is supported at its both ends so as to hold the rotor 105. Therefore, no substantial moment is applied to the main bearing 119 and the moment which acts to bend the crankshaft 106 is small, thus contributing to improvement in the reliability of the compressor. This arrangement, however, poses a problem that the rotary shafts including the crankshaft 106 tends to be mounted in a wrong manner during the assembly of the compressor, resulting in troubles such as vibration or breakdown of the bearings. Furthermore, the upper bearing 121 tends to suffer from a shortage of lubricant so that this bearing, which is of slide bearing type, runs a risk of damage. An arrangement shown in FIG. 2 has been proposed to overcome the abovedescribed problem. In this arrangement, a crankshaft 201 is supported at its end opposite to a main shaft 202 by an upper bearing 203 of rolling type. In contrast to a slide-type bearing, a rolling type bearing can bear both radial and axial loads and requires a smaller amount of lubricant than the slide-type bearing. The use of the rolling type bearing, therefore, provides a greater tolerance for assembly precision and reduces the requirement for lubrication (refer to, for example, Japanese Patent Laid-Open Publication Nos. 1-170779, 58-172485 and 62-253982). The rolling type bearing, however, poses another problem: namely, increase in vibration and noise due to axial vibration and resonance.

DISCLOSURE OF THE INVENTION

In view of the above-described problems, it is a first object of the present invention to improve vibration and noise characteristics and further to enhance reliability and performance.

A second object of the present invention is to prevent damage to of the rolling-type upper bearing which may be caused by dropping the compressor or during transportation.

To achieve the first object, the present invention in its first aspect provides a scroll-type compressor comprising: a hermetic container; an electric motor disposed in an upper portion of the hermetic container; a compression mechanism disposed in a lower portion of the hermetic container and driven by the electric motor, the compression mechanism including a stationary scroll member having a stationary frame and a stationary scroll wrap formed on the frame, an orbiting scroll member having an orbiting end plate and an orbiting scroll wrap formed on the end plate and meshing with the stationary scroll wrap to define therebetween a plurality of compression working chambers, and a rotation prevention member which prevents the orbiting scroll member from rotating about its own axis thereby to ensure that the orbiting scroll member makes only an orbiting motion; a crankshaft connected to the rotor of the electric motor for causing an orbiting motion of the orbiting scroll member and having a main shaft formed on one end thereof; a main bearing supporting the main shaft; an orbiting drive shaft formed on the side of the orbiting end plate opposite to the orbiting scroll wrap and received in an eccentric bearing disposed at an eccentricity in the main shaft; a rolling type upper bearing supporting the end of the crankshaft opposite to the main shaft; a lift limiting plate fixed to the lower surface of the upper bearing so as to prevent excessive lift of the crankshaft; a step formed on the crankshaft between a portion of a greater diameter at which the crankshaft is connected to the rotor and a portion of a smaller diameter at which the crankshaft is received in the upper baring; a support member resting on the inner race of the upper bearing; and a fixing member by which the crankshaft is suspended and supported by the support member such that a small clearance is left between the surface of the step and the lift limiting plate.

In a second aspect of the invention, the scroll-type compressor includes, in addition to the features of the first aspect, the feature that the magnetic center of the rotor of the electric motor is upwardly offset from the magnetic center of the stator of the electric motor.

In a third aspect of the invention, the scroll-type compressor includes, in addition to the features of the first aspect, the feature that the inner race of the upper bearing is bonded to the supporting surface of the support member.

In order to simultaneously achieve the first and second objects, according to a fourth aspect of the invention, there is provided a scroll-type compressor which comprises, in addition to the features of the first, second and the third aspects, an elastic member which exerts an axial urging force, a retaining member which cooperates with an end surface of the inner race of the upper bearing to retain the elastic member therebetween, and a fixing member by which the crankshaft is suspended and supported from the retaining member.

In a fifth aspect of the invention, the scroll-type compressor has, in addition to the features of the fourth aspect, a feature that the crankshaft is initially lifted by an amount which is smaller than the amount of deflection of the elastic member under the maximum limit load of the upper bearing.

In a sixth aspect of the invention, the scroll-type compressor has, in addition to the features of the fourth and fifth aspects, features wherein the crankshaft further has another step B which provides an upper portion of a further reduced diameter above the portion received in said upper bearing, the support member being fitted to the surface of the other step B so as to cause an initial deflection in the elastic member by a cooperation of the support member with the retaining member, the retaining member being held on the crankshaft by the fixing member, whereby the crankshaft is suspended and supported by the inner race of the upper bearing through the support member.

BEST MODE FOR CARRYING OUT THE INVENTION

Figure 1:
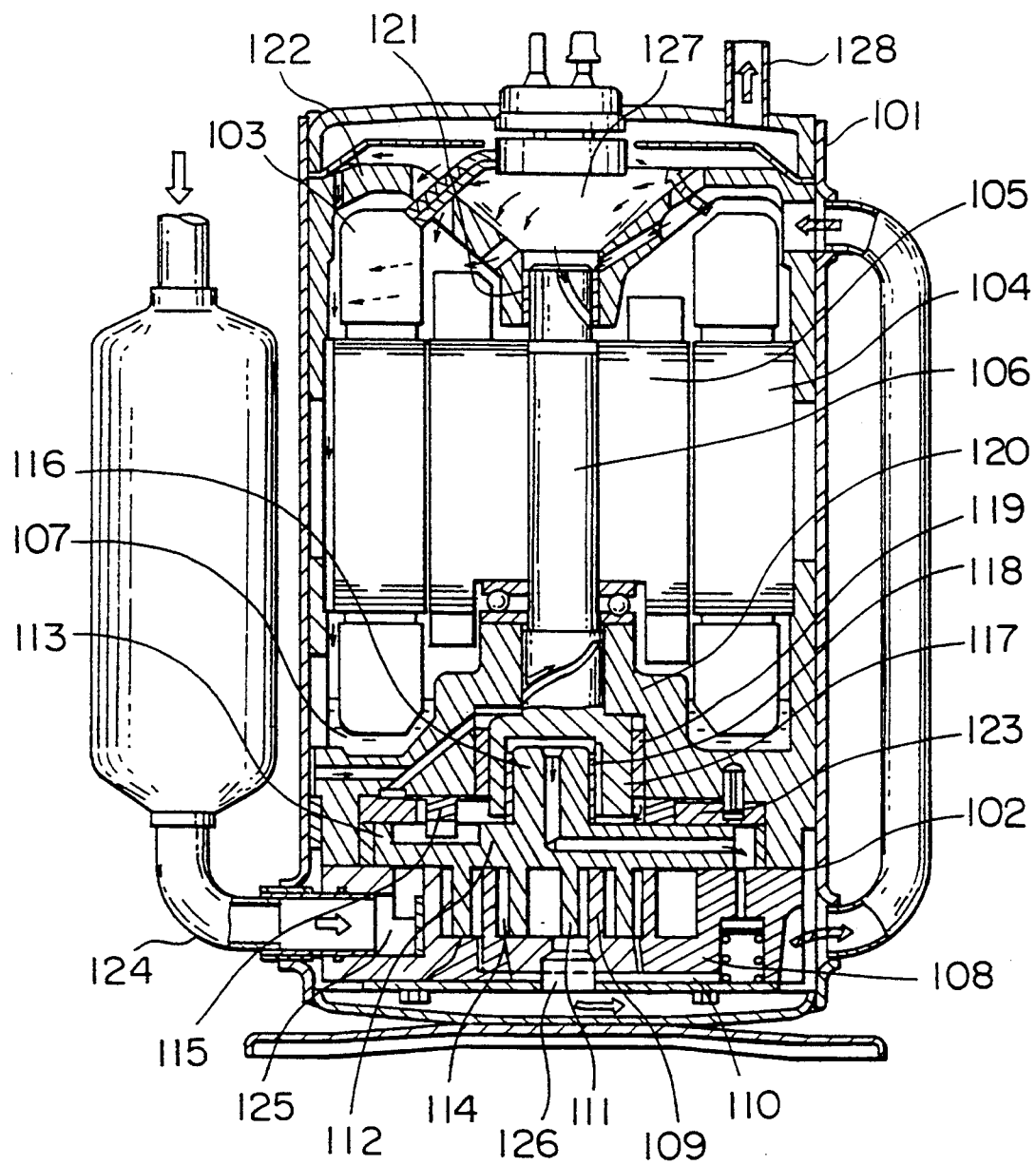
FIGS. 1 and 2 are sectional views of conventional scroll-type compressors.
Figure 2:
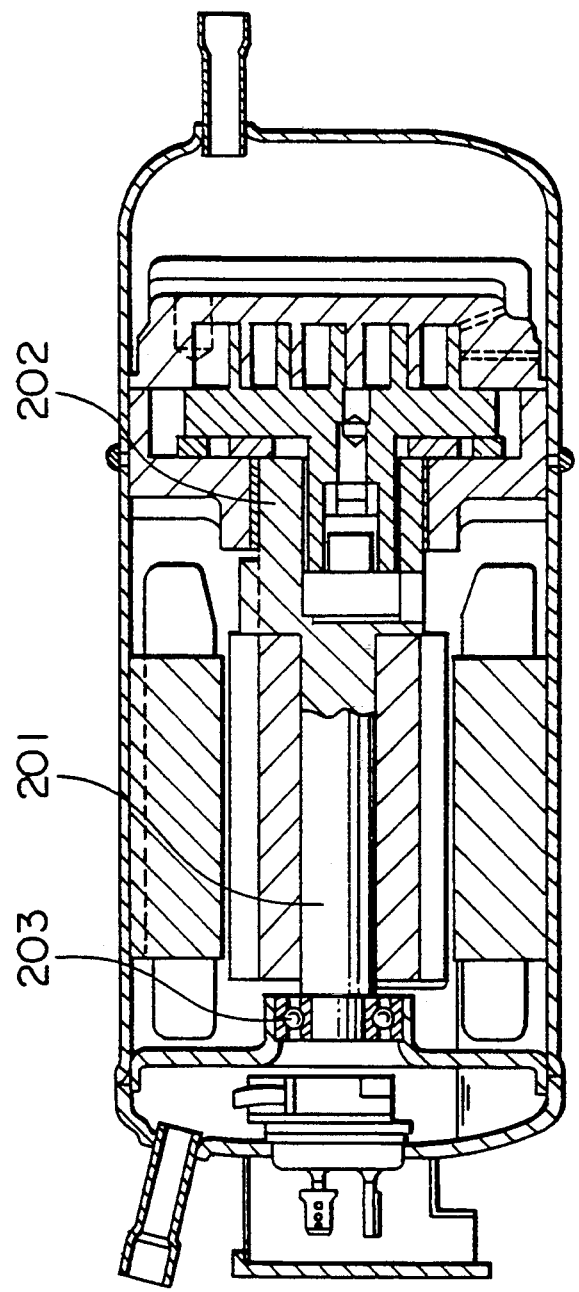
Figure 3:
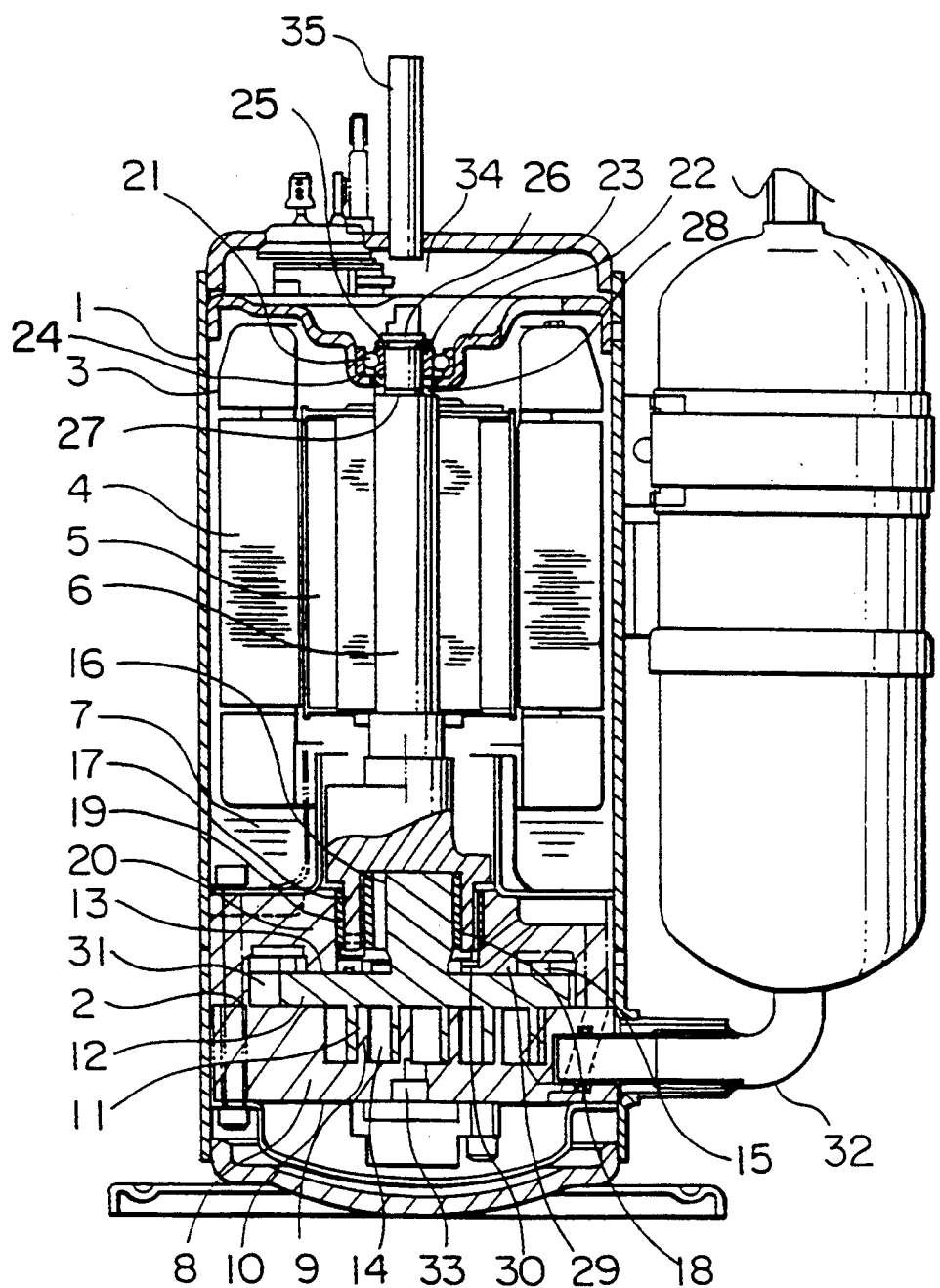
FIG. 3 is a sectional view of a first embodiment of the scroll-type compressor of the present invention.
Figure 4:
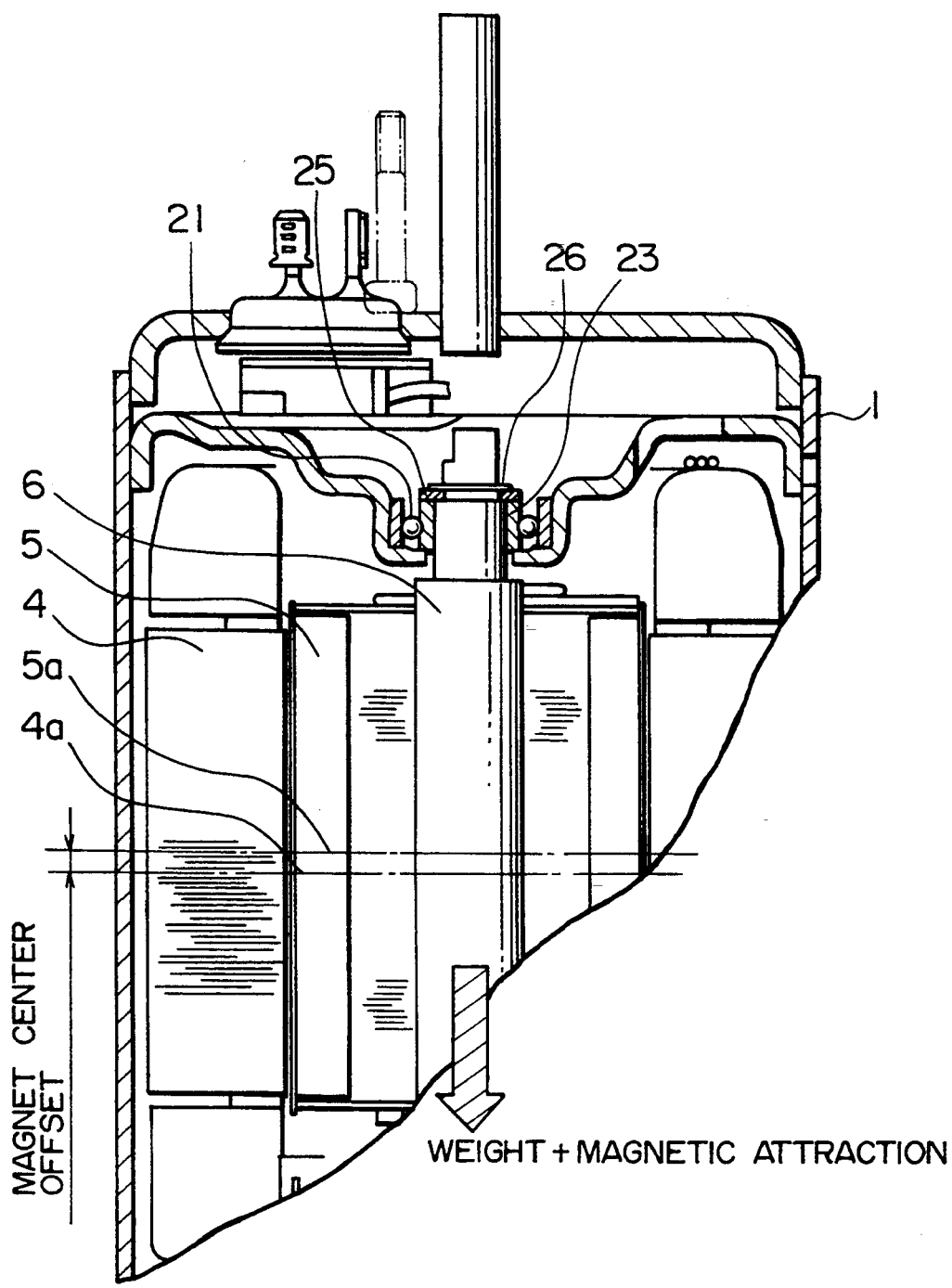
FIG. 4 is a fragmentary sectional view of a second embodiment of the scroll-type compressor of the present invention.
Figure 5:
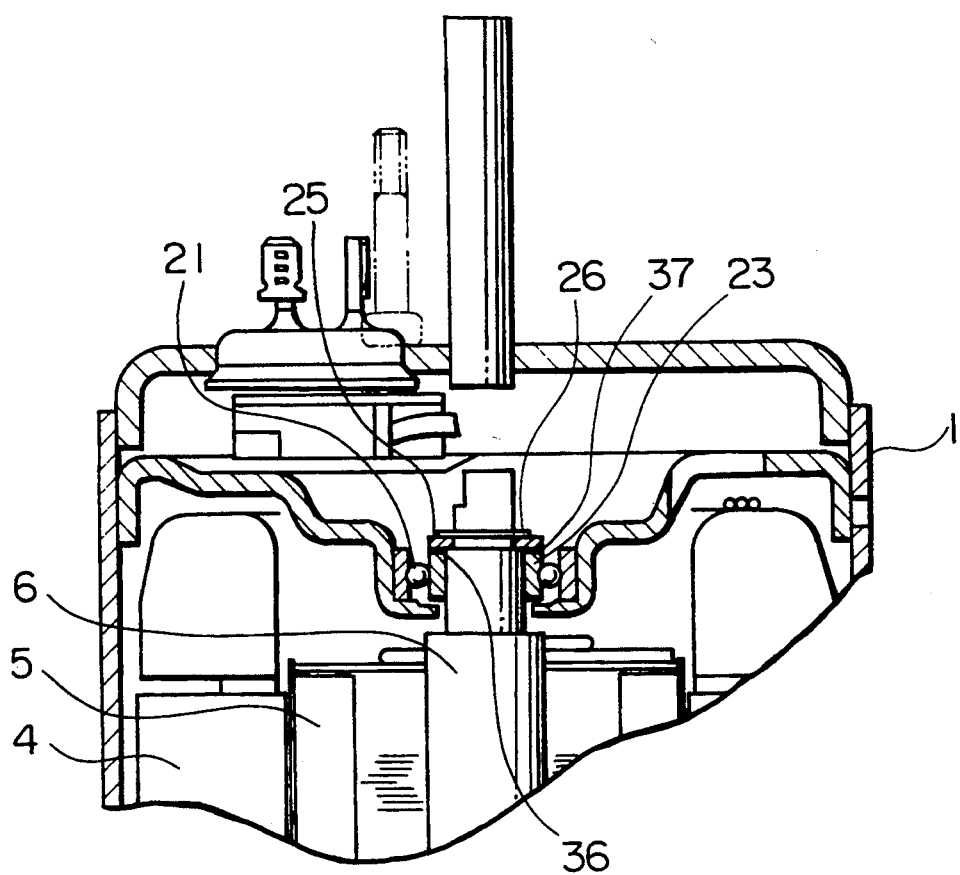
FIG. 5 is a fragmentary sectional view of a third embodiment of the scroll-type compressor of the present invention.
Figure 6:
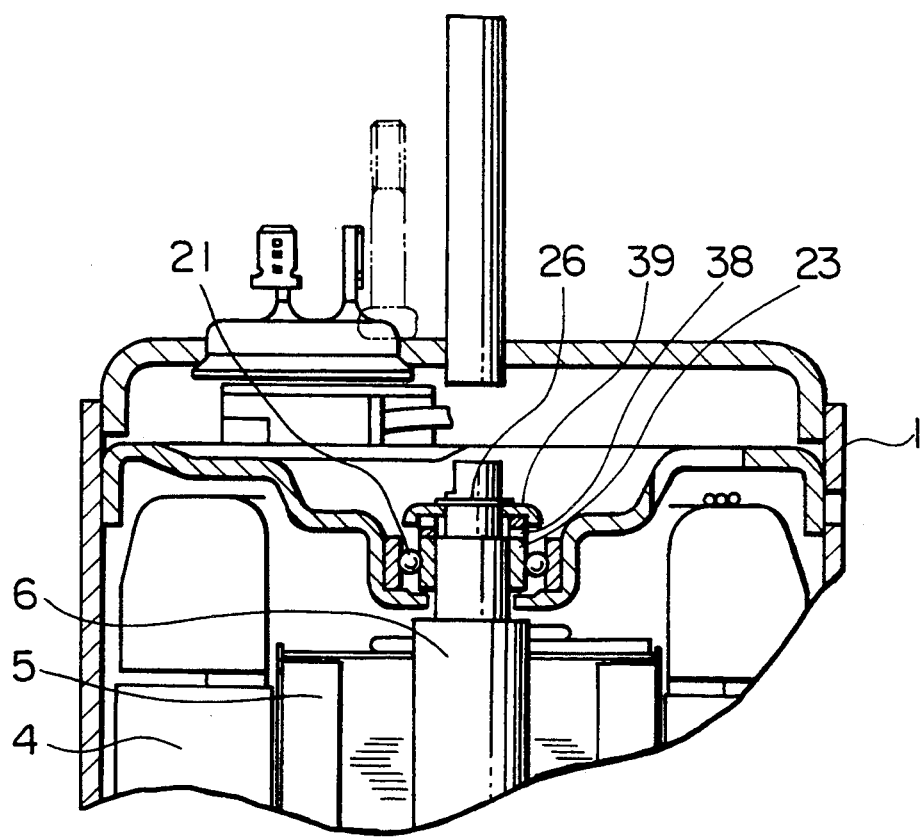
FIG. 6 is a fragmentary sectional view of a fourth embodiment of the scroll-type compressor of the present invention.
Figure 7:
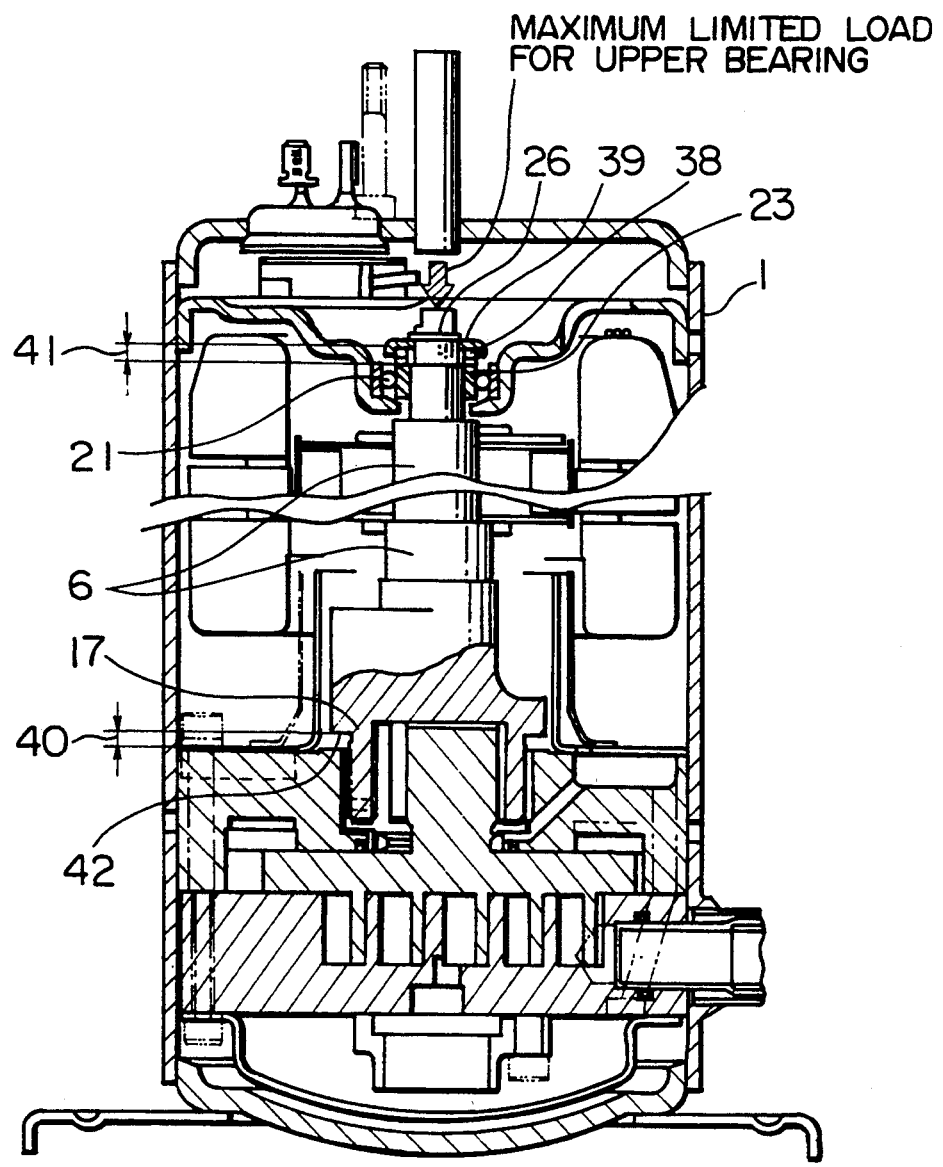
FIG. 7 is a sectional view of a fifth embodiment of the scroll-type compressor of the present invention.
Figure 8:
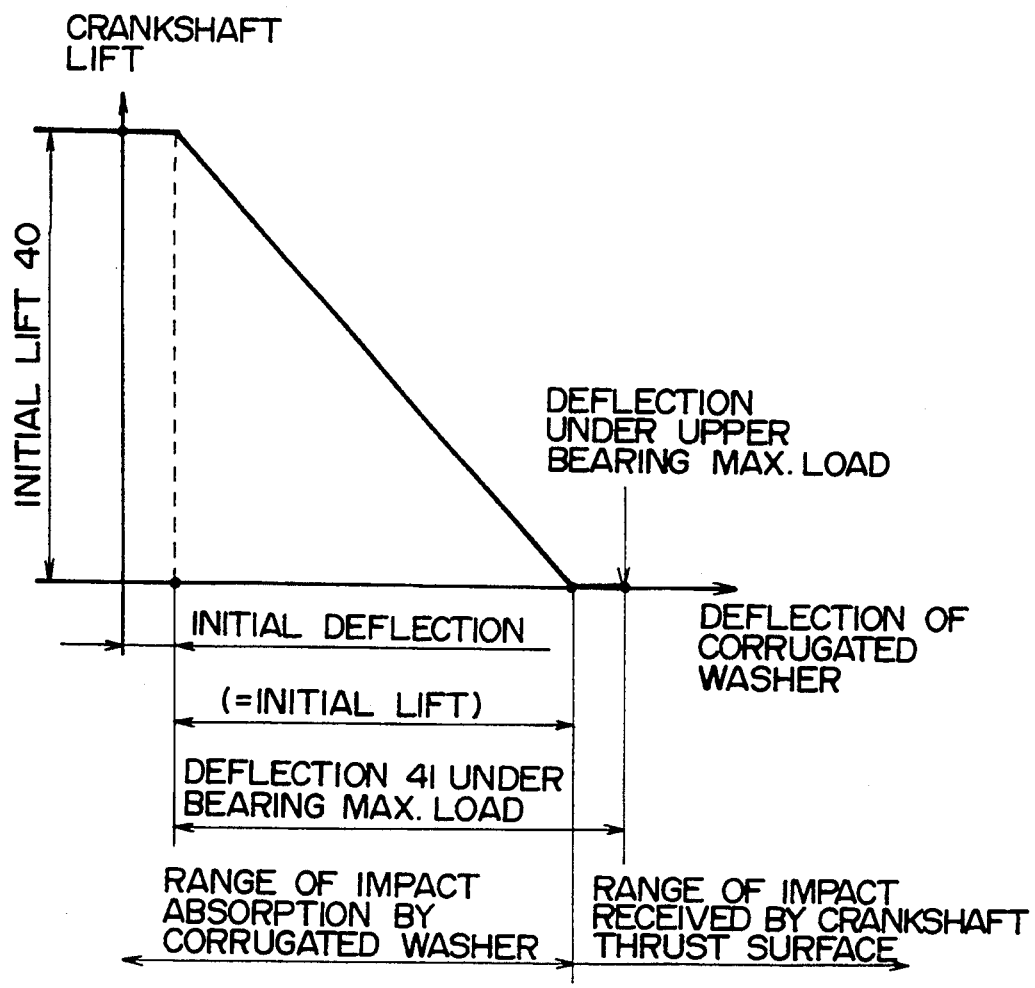
FIG. 8 is a characteristic chart illustrating the relationship between the amount of deflection of an elastic member which is a corrugated washer and the amount of lift of the crankshaft.
Figure 9:
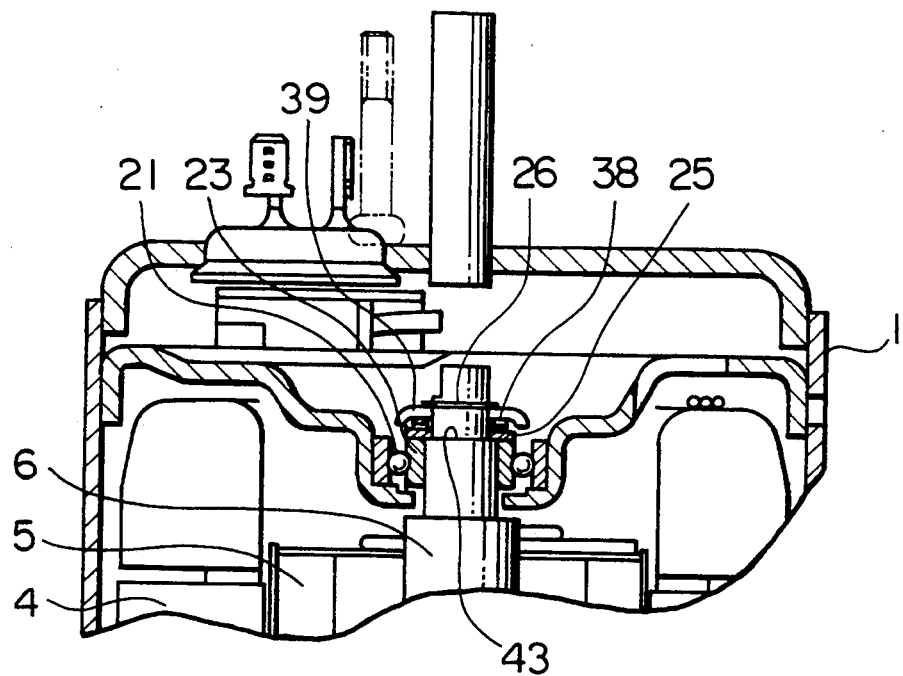
FIG. 9 is a fragmentary sectional view of a sixth embodiment of the scroll-type compressor of the present invention.
Figure 10:
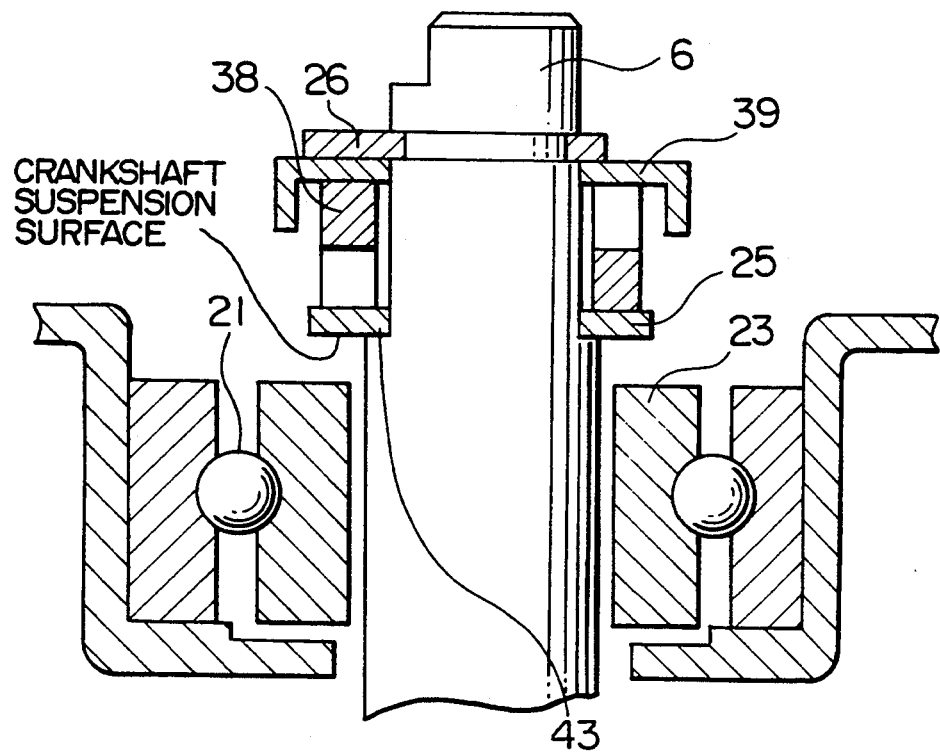
FIG. 10 is an enlarged sectional view of a portion of the scroll-type compressor of the invention incorporating a corrugated washer.

The scroll-type compressor of the present invention will be described hereinunder with reference to the drawings. A first embodiment will be described with specific reference to FIG. 3. Referring to this Figure, a stator 4 of an electric motor 3 for driving a compression mechanism 2 is fixed in a hermetic container 1. A crankshaft 6 for driving the compression mechanism 2 is connected to the rotor 5 of the electric motor 3. The bottom portion of the hermetic container 1 forms a lubricant reservoir 7. The compression mechanism 2 includes: a stationary scroll member 10 composed of a stationary frame 8 and a stationary scroll wrap 9 formed integrally with the stationary frame 8; an orbiting scroll member 13 composed of an orbiting scroll wrap 11 which meshes with the stationary scroll wrap 9 to define therebetween a plurality of compression working chambers 14, and an orbiting end plate 12 on which the orbiting scroll wrap 11 is formed; and a rotation prevention member 15 which prevents the orbiting scroll member 13 from rotating about its own axis so as to allow the same to make only an orbiting motion. An orbiting drive shaft 16 which is provided on the side of the orbiting end plate 12 opposite to the orbiting scroll wrap 11 is received in an eccentric bearing 18 which is provided in a main shaft 17 formed on one end of the crankshaft 6. The crankshaft 6 is supported by a main bearing assembly 20 including a main bearing 19 which supports the main shaft 17 and an upper bearing assembly 22 including a rolling-type upper bearing 21 which supports the end of the crankshaft 6 opposite to the main shaft 17. A lift limiting plate 24 provided on the lower side of the upper bearing 21 acts to prevent excessive lift of the crankshaft 6. The lift limiting plate 24 is fixed to and integrated with the upper bearing assembly 22. The crankshaft 6 is suspended by a stopper ring 26 which rests on a supporting member 25 carried by an end surface of the inner race 23 of the upper bearing 21. A small clearance 28 is left between the lift limiting plate 24 and a stepped surface 27 which is provided between the portion of the crankshaft 6 received in the upper bearing 21 and the portion of the crankshaft 6 coupled to the rotor 5. An axial movement limiting plate 29 for limiting the axial movement of the orbiting scroll member 13 is integrated with the main bearing assembly 20 so as to form a small clearance between itself and the back side of the orbiting end plate 12 opposite to the orbiting scroll wrap 11. An annular back pressure partitioning member 30 slidably contacts the back side of the orbiting end plate 12 so as to partition the area on the back side of the orbiting end plate 12 into a central region where the discharge pressure of the compressor is applied and a peripheral region which forms a back-pressure chamber which receives a back pressure lower than the discharge pressure. In operation, a gaseous refrigerant sucked through a suction pipe 32 connected to the compressor is introduced into the compression mechanism 2 so as to be compressed in the compression working chamber 14. The compressed refrigerant gas is then discharged through a discharge port 33 and is delivered to the exterior of the compressor through the discharge chamber 34 and the discharge pipe 35. In the arrangement described, the weight of the crankshaft and its associated members is applied as an axial pre-load to the inner race 23 of the upper bearing 21 through the support member 25. This pre-load effectively prevents axial vibration of the crankshaft, as well as resonance of the same, thereby suppressing generation of noise which may otherwise be generated in the upper bearing 21. The pre-load on the upper bearing, however, serves to increase the rigidity of the bearing to adversely affect the reliability of the bearing particularly at a high-speed of rotation. In this embodiment, however, the arrangement is such that a refrigerant gas suspending lubricant is made to pass through a space around the upper bearing 21 so as to lubricate the upper bearing 21, thus ensuring sufficient durability of the bearing. Any excessive lift of the crankshaft 6 which may occur when the compressor is shocked by being dropped or during transportation is prevented by the mutual contact between the step surface 27 of the crankshaft 6 and the lift limiting plate 24. Furthermore, since the thrust force acting on the crankshaft and associated parts is borne by the rolling type upper bearing alone, the loss of power due to friction caused by the thrust force is reduced. A second embodiment of the present invention will be described with reference to FIG. 4. In this Figure, the same reference numerals are used to denote the same parts or members as those in the first embodiment. Detailed description of such parts or members is omitted. Referring to this Figure, the rotor 5 of the electric motor 3 is disposed such that the center 5a of the rotor 5 is upwardly offset from the center 4a of the stator 4. According to this arrangement, a magnetic attracting force is generated to act on the crankshaft due to the offset between the magnet centers of the rotor 5 and the stator 4 of the electric motor 3. The magnetic attracting force, in addition to the weight of the crankshaft applied in the first embodiment, acts to axially pre-load the inner race 23 of the upper bearing 21, thus enhancing the effect of suppressing generation of noise in the upper bearing. A third embodiment of the present invention will be described with reference to FIG. 5. In this Figure, the same reference numerals are used to denote the same parts or members as those in the preceding embodiments. Detailed description of such parts or members is omitted. Referring to this Figure, the inner race 23 of the upper bearing 21 is fixed to the supporting surface 36 of the supporting member 25 by a bonding means such as a bond 37 so as not to be easily separated therefrom. This arrangement eliminates any slip between the inner race 23 of the upper bearing 21 and the crankshaft 6. As a consequence, wear is reduced at the mating surfaces of the crankshaft 6 and the upper bearing 21. This effect, in combination with the advantages provided by the first and second embodiments, contributes to a further improvement in reliability. A fourth embodiment of the present invention will be described with reference to FIG. 6. In this Figure, the same reference numerals are used to denote the same parts or members as those in the preceding embodiments. Detailed description of such parts or members is omitted. Referring to this Figure, a corrugated washer 38 as an axial elastic urging member is disposed on the inner race 23 of the upper bearing 21 and is retained by a retaining member 39. The crankshaft 6 is suspended by a stopper ring 26 on the retaining member 39 so as to be supported by the end surface of the inner race 23 of the upper bearing 21 through the corrugated washer 38. This arrangement offers, besides the suppression of noise generation from the upper bearing performed in the first to third embodiments, an advantage that the elasticity of the corrugated washer 38 reduces any impact on the upper bearing 21 which may be applied due to dropping or during transportation, thus protecting the upper bearing 21. A fifth embodiment will be described with reference to FIGS. 7 and 8. In these Figures, the same reference numerals are used to denote the same parts or members as those in the preceding embodiments. Detailed description of such parts or members is omitted. Referring to those Figures, the initial lift 40 of the crankshaft 6 is set to be smaller than the amount 41 of deflection of the corrugated washer 38 under the maximum limit load which is borne by the upper bearing. As will be seen also from FIG. 8, in an event that an impact is applied due to dropping or during transportation, the lift of the crankshaft 6 becomes zero before the impact load on the upper bearing 21 exceeds the above-mentioned maximum limit load. Namely, the impact load is received by the thrust surface 42 of the crankshaft 6 adjacent the main shaft 17, so that any impact load exceeding the maximum limit load is not applied to the upper bearing. Thus, a further protection of the upper bearing 21 is achieved besides the effect produced by the fourth embodiment. A sixth embodiment of the present invention will be described with reference to FIGS. 9 and 10. In these Figures, the same reference numerals are used to denote the same parts or members as those in the preceding embodiments. Detailed description of such parts or members is omitted. Referring to FIG. 9, the crankshaft 6 has such a stepped form that its portion above the portion received in the upper bearing 21 has a reduced diameter, and a support member 25 fits on the crankshaft 6 in contact with a step surface 43. The corrugated washer 38 is pre-loaded between the support member 25 and the retaining member 39 so as to have an initial deflection. The retaining member 39 is held on the crankshaft 6 by means of a stopper ring 26. The crankshaft 6 is suspended by the support member 25 which rests on the end surface of the inner race 23 of the upper bearing 21. The detail of the initial loading of the corrugated washer 38 will be described with reference to FIG. 10 which is an enlarged view of the portion where the corrugated washer is incorporated. After the corrugated washer 38 is placed on the upper surface of the support member 25, the retaining member 39 is axially pressed into the corrugated washer 38 so as to initially deflect the same. Then, the stopper ring 26 is fitted to fix the corrugated washer 38 to the crankshaft 6. If the corrugated washer 38 is initially deflected by a pre-load greater than the weight of the crankshaft and the associated parts, the corrugated washer does not function as an elastic member during normal operation of the compressor because no load exceeding the above-mentioned weight acts on the corrugated washer under such operating condition. In consequence, any resonance of the corrugated washer with the operation frequency is avoided to provide a further reduction in vibration and noise besides the effects produced by the fourth and fifth embodiments. Although stopper ring 26 is used for the purpose of suspending and fixing the crankshaft 6, this is not exclusive, and the stopper ring may be replaced by a suitable means, e.g., a bolt, which prevents easy disengagement of the crankshaft. In addition, the corrugated washer used as the elastic member in the fourth, fifth and sixth embodiments may be replaced with any other type of elastic member which has an elasticity limit exceeding the maximum limit load applied to the upper bearing 21.

INDUSTRIAL APPLICABILITY

As will be understood from the foregoing description, according to the invention, the weight of the crankshaft and associated parts acts as an axial pre-load on the inner race of the rolling-type upper bearing through a support member. It is therefore possible to suppress the generation of noise in the upper bearing caused by the axial vibration and resonance of the shaft system. In addition, any excessive lift of the crankshaft which may occur due to dropping of the compressor or during transportation is eliminated by virtue of the contact between the step surface of the crankshaft and the lift limiting plate. Furthermore, since the total thrust force acting on the crankshaft and associated parts is borne by the rolling-type upper bearing alone, loss of power due to friction caused by the thrust can be reduced. When the electric motor is arranged such that the magnetic centers of its rotor and stator are offset from each other, a magnetic attracting force acts as an axial pre-load on the inner race of the upper bearing in addition to the weight of the crankshaft and associated parts, so that the generation of noise in the upper bearing is further suppressed. Fixing of the inner race of the upper bearing to the supporting surface of the support member by bonding means eliminates any slip between the inner race of the upper bearing and the crankshaft, thus reducing wear of the mating surfaces of these two members to further improve the reliability. An elastic member such as a corrugated washer reduces any shock which may be applied to the upper bearing due to dropping or during transportation, thus enhancing the effect of protecting the upper bearing. The initial lift of the crankshaft is determined to be smaller than the amount of deflection of the elastic member caused under maximum limit load which can be borne by the upper bearing. Therefore, the lift of the crankshaft becomes zero before the impact load caused by dropping or during transportation of the compressor exceeds the maximum upper limit of the load on the upper bearing, and the impact load is received by the crankshaft. As a result, any impact load exceeding the maximum limit load is never applied to the upper bearing, whereby the upper bearing is protected perfectly. When the elastic member is initially deflected by a pre-load exceeding the weight of the crankshaft and associated parts, the elastic member does not exhibit any elasticity during normal operation of the compressor in which no load exceeding the abovementioned weight is applied to the elastic member. Consequently, resonance of the elastic member with the operation frequency of the compressor is avoided. This prevents any resonance of the elastic member at a frequency generated during operation of the compressor, thus contributing to a further reduction in the vibration and noise. As has been described, the present invention provides a scroll-type compressor which operates at reduced levels of noise and vibration and which is superior both in reliability and performance.

We claim:

1. A scroll-type compressor comprising: a hermetic container;
   an electric motor having a rotor and disposed in an upper portion of said hermetic container;
   a compression mechanism disposed in a lower portion of said hermetic container and driven by said electric motor, said compression mechanism including a stationary scroll member having a stationary frame and a stationary scroll wrap formed on said stationary frame, an orbiting scroll member having an orbiting end plate and an orbiting scroll wrap formed on said orbiting end plate and meshing with said stationary scroll wrap to define a plurality of compression working chambers, and a rotation prevention member which prevents said orbiting scroll member from rotating about an axis of said orbiting scroll member thereby to ensure that said orbiting scroll member thereby to ensure that said orbiting scroll member makes only an orbiting motion;
   a crankshaft connected to said rotor of said electric motor for causing the orbiting motion of said orbiting scroll member and having a main shaft formed at one end of said crankshaft;
   an eccentric bearing disposed at an eccentric location in said main shaft;
   a main bearing supporting said main shaft;
   an orbiting drive shaft formed on a side of said orbiting end plate opposite to said orbiting scroll wrap and received in said eccentric bearing;
   a rolling type upper bearing supporting an end of said crankshaft opposite to said main shaft;
   a step formed on said crankshaft between a first portion of a greater diameter at which said crankshaft is connected to said rotor and a second portion of a smaller diameter at which said crankshaft is received in said upper bearing to provide an upwardly directed surface;
   a lift limiting plate fixed to a lower surface of said upper bearing and disposed above said upwardly directed surface so as to prevent a lift of said crankshaft from exceeding a predetermined value;
   a support member resting on an inner race of said upper bearing; and
   a fixing member by which said crankshaft is suspended and supported from said support member such that a clearance is left between said upwardly directed surface of said step and said lift limiting plate.

2. A scroll-type compressor according to claim 1, wherein a magnetic center of said rotor of said electric motor is upwardly offset from a magnetic center of a stator of said electric motor.

3. A scroll-type compressor according to claim 1, wherein the inner race of said upper bearing is bonded to the supporting surface of a support member.

4. A scroll-type compressor according to claim 1, further comprising an elastic member which exerts an axial urging force and a retaining member which cooperates with an end surface of said inner race of said upper bearing to retain said elastic member between said inner race and said retaining member, said crankshaft being suspended and supported by said fixing member from said retaining member.

5. A scroll-type compressor according to claim 4, wherein said crankshaft is initially lifted by an amount which is smaller than an amount of deflection of said elastic member under a maximum limit load of said upper bearing.

6. A scroll-type compressor according to claim 4, wherein said crankshaft further has another step which provides an upper portion of a diameter less than said smaller diameter of said second portion of said crankshaft, said upper portion being disposed above said second portion at which said crankshaft is received in said upper bearing, said another step providing an additional upwardly directed surface between said second portion and said upper portion, said support member being engaged with said additional upwardly directed surface to cooperate with said retaining member to cause an initial deflection in said elastic member, said retaining member being held on said crankshaft by said fixing member, whereby said crankshaft is suspended and supported by said inner race of said upper bearing through said support member.

7. A scroll-type compressor according to claim 4, wherein said elastic member comprises a corrugated washer.

* * * * *

UNITED STATES PATENT AND TRADEMARK OFFICE
CERTIFICATE OF CORRECTION

PATENT NO. : 5,340,287
DATED : August 23, 1994
INVENTOR(S) : Sadao KAWAHARA et al It is certified that error appears in the above-indentified patent and that said Letters Patent is hereby corrected as shown below:

Front Page, Item [22] PCT Filed:, change "Jun. 26, 1990" to --Nov. 2, 1990--.

Signed and Sealed this

Seventeenth Day of January, 1995

Attest:

BRUCE LEHMAN

Attesting Officer

Commissioner of Patents and Trademarks